United States Patent [19]
Geng et al.

[11] 3,947,671
[45] Mar. 30, 1976

[54] BINARY PARALLEL COMPUTING ARRANGEMENT FOR ADDITIONS OR SUBTRACTIONS

[75] Inventors: Hellmuth Roland Geng, Herrenberg; Johann Hajdu; Günter Knauft, both of Boeblingen, all of Germany

[73] Assignee: International Business Machines Corporation, Armonk, N.Y.

[22] Filed: June 23, 1975

[21] Appl. No.: 589,091

[30] Foreign Application Priority Data
July 6, 1974  Germany............................ 2432450

[52] U.S. Cl. .............................................. 235/175
[51] Int. Cl.² ........................................... G06F 7/50
[58] Field of Search ................................... 235/175

[56] References Cited
FOREIGN PATENTS OR APPLICATIONS
288,415  2/1971  U.S.S.R. ............................. 235/175

Primary Examiner—R. Stephen Dildine, Jr.
Attorney, Agent, or Firm—Robert W. Berray

[57] ABSTRACT

A parallel adder with sequential carry ripple is subdivided into sections. Detector circuits are distributed over the various digit positions of the adder. Each detector circuit receives the digit pairs of the input operands of at least one adder position. The detection circuits indicate the beginning or the end of a carry ripple chain by testing the condition "both input digits zero or both input digits one". Via a coder, the output signals of the detection circuits are combined in the form of group indicating signals, each of which corresponds to a predetermined distance between the digit positions. By means of the group indicating signals a clock circuit is controlled in such a manner that the operating time is limited to the time required for carry rippling.

8 Claims, 6 Drawing Figures

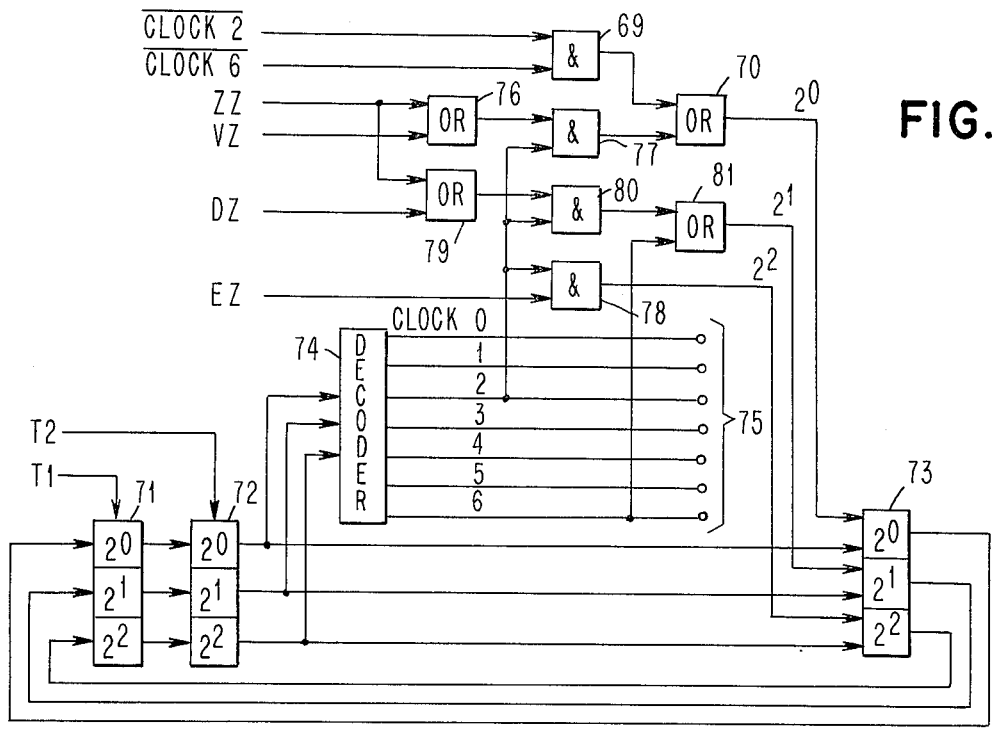
FIG. 3
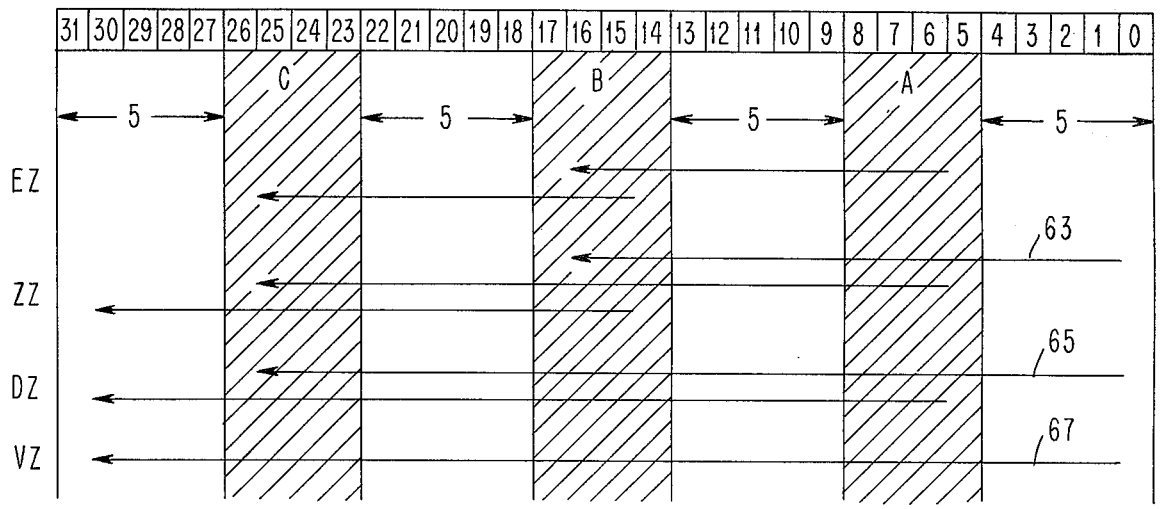

BINARY PARALLEL COMPUTING ARRANGEMENT FOR ADDITIONS OR SUBTRACTIONS

BACKGROUND

1. Field of The Invention

The invention relates to a multi-position, binary parallel computing arrangement for additions or subtractions, with sequential carry propagation and with a clock circuit permitting a variable operating time.

2. Description of Prior Art

In parallel adders the clock time for processing two operands is a function of the time required for rippling carries, if any. Therefore, it is necessary to assume the worst case where a carry has to pass all positions of the computing arrangement. As this happens relatively rarely, a fixed clock time would lead to considerable idling.

It is known to shorten the operating time of binary adders by scanning the carry signals rippling from one digit position to another for the end of the carry processing step ("The Logic of Computer Arithmetic", pp. 79–81, by I. Flores, London 1963). Such an arrangement which is also referred to as carry-complete adder operates asynchronously. OR-circuits, connected to an AND-circuit common to all digit positions, are associated with the carry outputs of the individual digit positions. A carry signal appearing in one of the digit positions is transmitted to the common AND circuit via the OR circuit of the respective digit position. The arrangement is such that the carry signals are maintained until the end of an addition. Apart from this, each carry connection from one digit position to the next higher one consists of two lines, one of which carries the true signal, whereas the other carries the negated carry signal. At the beginning of an addition, both lines are without signals. After the operands have been fed to the adder and addition has begun, a certain signal state occurs within the carry connections as the carries are being handled. After this state has been reached for all digit positions of the adder, the common AND circuit emits an output signal indicating the end of addition. In this instance, the operation cycle is discontinued and transmission of the result from the result register to the connected units can be initiated.

This arrangement has the disadvantage of requiring extensive circuitry for generating the true and negated carry signals and for determining by scanning means whether these carry signals are present in their entirety. Furthermore, such an arrangement is intended for use in asynchronously operating processors which since they permit the end of a carry processing operation being detected at an early state, can utilize the advantage thus obtained by immediately initiating subsequent operations. An effective use of the known arrangement would necessitate, for example, that immediately after the carry rippling step is completed, the result is passed on or evaluated, irrespective of the switching state the processor is in at this stage. Processors organized in this way are not being used too widely because of the extensive circuitry they require. When processors are organized the emphasis is rather on synchronous operation, whereby fixed clock times are associated with the individual transmission and operation cycles.

On the other hand it is known to provide a varying number of machine cycles for specific operations in synchronously operating processors. This is done under the control of the operation code of those instructions that control the respective operations. The control signals derived from the operation code act on the clock circuit which is thus enabled to provide a variable number of machine cycles.

SUMMARY OF THE INVENTION

It is the object of the invention to provide a computing arrangement for additions and subtractions, which by using few circuits reduces the computing time to the required value as determined by carry processing but which is nevertheless integratable into the organization of an essentially synchronously operating processor. In accordance with the invention, this is achieved in that detection circuits are distributed over the digit positions, each detection circuit receiving the digit pairs of the input operands of at least one adder position, and the various detection circuits indicating the beginning or the end of a carry ripple by testing the condition "both input digits 0 or both input digits 1", that the output signals of the detection circuits, are combined, via a coder, in the form of group indicating signals, each of which corresponds to a predetermined distance between the digit positions, and that the group indicating signals influence the clock circuit in such a manner that the operating time is limited to the duration of the carry ripple over the shortest digit position distance determined by the group indicating signals.

BRIEF DESCRIPTION OF DRAWINGS

FIG. 3 shows a clock circuit that can be used in connection with the computing arrangement of FIG. 2.

FIGS. 4A and 4B are diagrammatic representations of the clock pulse programs generated by the circuit of FIG. 3, and FIG. 5 is a diagrammatic representation of various carry ripple chains detected by the logic of FIG. 2.

DETAILED DESCRIPTION OF THE INVENTION

Figure 1:
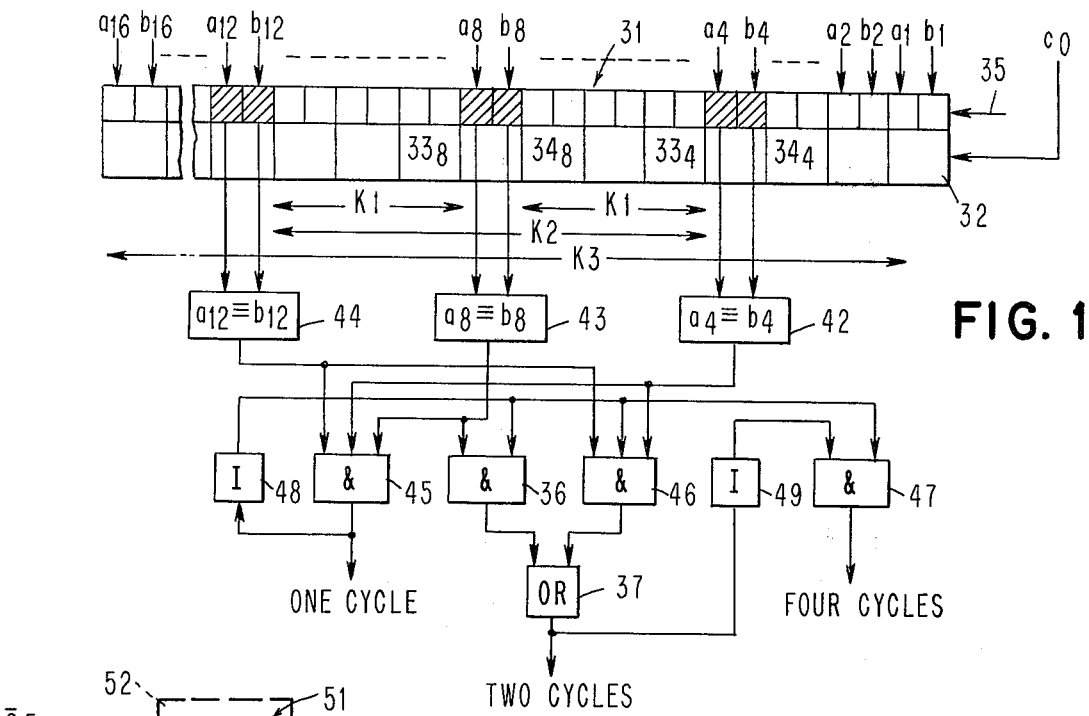
FIG. 1 shows a block diagram of a first embodiment of a parallel adder designed in accordance with the invention.

FIG. 1 shows a binary parallel computing arrangement in the form of an adder with sequential carry ripple. The adder has 16 digit positions, of which only some are shown. Each digit position comprises a binary full adder stage 32 designed in a manner known per se for forming a sum signal, e.g., $s_l$, and a carry signal, e.g., $c_l$, from two binary operand digits, e.g., $a_l$ and $b_l$, and a carry signal from the preceding position, e.g., $c_o$. The output lines for the sum signals $s_n$ as well as the lines for transmitting the carries $c_n$ from one digit position to the next higher one are not shown in FIG. 1. Carry transmission is effected in a manner known per se in that the carry generated in one digit position is transmitted to the next higher digit position and is processed together with the operand digits present in that position, during which process a further carry may be propagated to the next high position, etc. Thus, it is possible for a carry to propagate itself from the lowest to the highest digit position before the sum signals of all digit positions have been determined. In addition, each digit position is associated with two input gates 33,34 through which the binary operand signals are applied to the full adder stages. The input gates 33, 34 of all digit positions are jointly opened by a clock signal on line 35 so that the operand signals can be fed to the full adder stages.

In the embodiment shown, the outputs of the input gates of every fourth digit position of the adder are additionally connected to one detection circuit 42, 43 and 44 each. The digit positions concerned are the fourth, eighth and the twelfth digit position, whereby the labelling of the digit positions was chosen in accordance with the ascending position value. The detection circuits test the corresponding digit positions for the beginning or the end of a carry ripple. To this end each of the detection circuits 42 to 44 forms the equivalence function of the two input signals, in order to determine whether both input digits have the value 1 or 0. In the former case, the detection circuits indicate that a carry is being formed in the corresponding digit position and which may propagate itself over a number of higher digit positions, thus initiating a potential carry ripple chain. This does not take account of the fact that in addition to the scanned operand digits, a carry from the next higher digit position may be fed to the corresponding digit position. In the latter case the scanned digit position would be part of a carry ripple chain starting in a lower digit position; however, from the standpoint of the indication function of circuits 42, 43, 44 this does not make any difference.

If the detection circuit detects on the other hand that both operand digits scanned have the value 0, this means that a carry ripple chain, if any, starting in a lower digit position will terminate at the latest in the scanned digit position, as in such a case an incoming carry cannot trigger a further carry to the next higher digit position.

Detection circuits 42 to 44, uniformly distributed over the length of the parallel adder, thus subdivide the adder into equally long sections of four digit positions each. If each of the three detection circuits 42 to 44 emits a signal indicating the presence of equivalent input signals, this means that carry ripple chains, if any, do not have to pass more than four digit positions (chain length K1). Accordingly, the operating time required for performing one addition can be such that it corresponds to the duration of carry propagation through four digit positions. In FIG. 1, this state is indicated by the AND circuit 45 which is connected to the outputs of the detection circuits 42, 43 and 44. It is assumed that carry ripple or propagation through four digit positions does not take longer than one machine cycle. In this case the output signal of the AND circuit 45 can serve to control a clock circuit not shown in FIG. 1 and which is used to limit the computing time to one machine cycle.

If, on the other hand, the detection circuits 42 and 44, with the exception of the detection circuit 43, emit a signal indicating equivalent operand digits, this means that processing of the existing operand digits may require a carry ripple chain of eight digit positions (chain length K2). The same chain length is obtained if detection circuit 43, rather than all three detection circuits 42, 43, 44, has previously emitted an indicating signal. This also applies to cases in which detection circuit 43 and only one of the detection circuits 42 or 44 emit indicating signals. In all of these cases the operating time must, as a precaution, be two machine cycles long. An AND circuit 36, connected to the detection circuit 43 and receiving the output signal of AND circuit 45 via an inverter 48, generates a control signal via an OR circuit 37. This signal causes the clock circuit not shown to generate two machine cycles. An AND circuit 46, connected to the outputs of the detection circuits 42 and 44 and which, in addition, receives the output signal of AND circuit 45 via inverter 48, generates a corresponding control signal via OR circuit 37. This signal causes the clock circuit not shown to generate two machine cycles.

A further state indicated consists in none of the detection circuits 42, 43 and 44 generating an output signal. In this instance, the operand combination applied to the input of the parallel adder may result in a carry ripple chain extending over more than eight positions (chain length K3). The processing of carries of such length requires more than two machine cycles. To make allowances for the worst case where a carry is generated in the first digit position and has to be transmitted as far as the 16th digit position, the operation time must be four machine cycles long. An AND circuit 47, connected to the outputs of AND circuits 45 and 46 via inverter 48 and a further inverter 49, emits a control signal if none of the detector circuits 42 to 44 indicates that operand digits are equivalent. The control signal of AND circuit 47 causes the clock circuit not shown to generate four machine cycles for the addition to be carried out.

The foregoing description shows that subdivision of the adder into sections and scanning of the digit positions on the boundaries of these sections for the presence of equivalent operand digits permit precasting the operating time required for performing the addition, since this time is solely a function of the length of possible carry ripple chains. The detection circuits determine which carry ripple chains are to be expected, whereby corresponding control signals for a clock circuit are generated by logic circuits 36, 37, 45 to 47 acting as a coder. This, in turn, enables the clock circuit to selectively provide one, two or four machine cycles as the computing time. Thus, precasting or look-ahead determination of the operating time is invariably effected from the standpoint of the worst condition experienced during carry processing, although this worst condition need not occur during computation. This look-ahead determination of the operating time offers considerable time savings without requiring extensive circuitry, since on an average only few combinations of the operand digits to be processed involve long carry ripple chains. As the logic circuits 36, 37, 45 to 47 operate parallel to the adder stages, no additional time is required for generating the operating time control signals.

Figure 2:
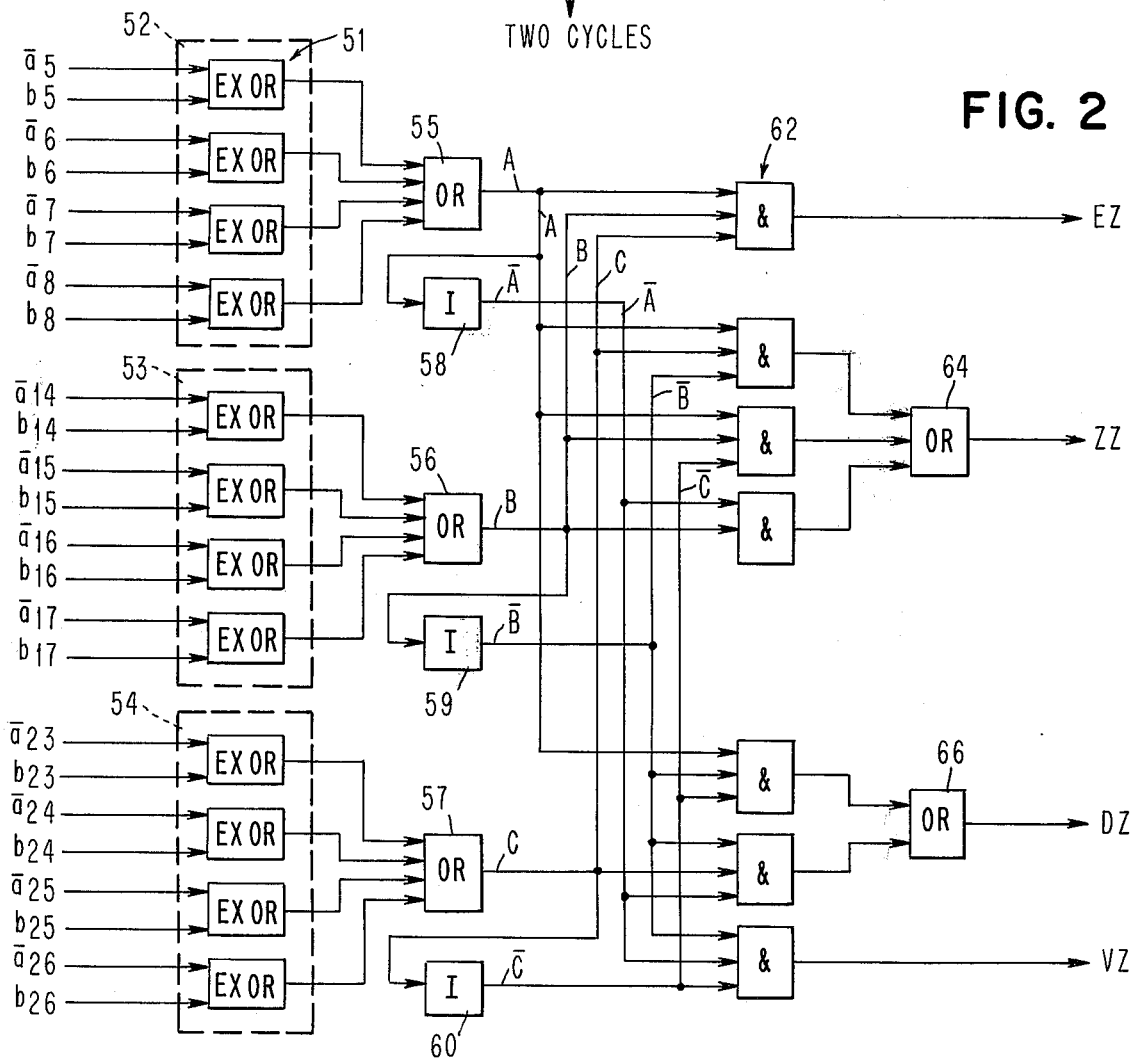
FIG. 2 shows a logic diagram of a second embodiment of a parallel adder designed in accordance with the invention.

The concept explained above can be rendered more effective by associating each scanning circuit with a group of adjacent digit positions, rather than with only one such position. A corresponding embodiment is shown in FIG. 2. The circuit illustrated in this figure is destined for a binary parallel adder with 32 digit positions. For simplicity's sake, FIG. 2 shows only the detection circuits and the circuit components for generating the control signals for the clock circuit of FIG. 3. Deviating from the embodiment of FIG. 1, EXCLUSIVE OR circuits 51 are used as detection circuits. Each of these EXCLUSIVE OR circuits receives a true and a negated digit signal of the operand digits of a digit position. Thus, the output signal of each EXCLUSIVE OR circuit 51 corresponds to the function of equivalence of two input digits of the same order, as, for example, in the case of the detection circuits 42 to 44.

EXCLUSIVE OR circuits 51 form three groups 52, 53 and 54, each of which represents a detection circuit. Dedtection circuit 52 is associated with the digit positions 5 to 8, detection circuit 53 with the digit positions 14 to 17, and detection circuit 54 with the digit positions 23 to 26. Thus, the scheme illustrated in FIG. 5 is obtained according to which the digit positions of the adder are subdivided by the three detection circuits 52, 53 and 54 into four sections, each of which comprise five adjacent digit positions.

One OR circuit 55 to 57, connected to the outputs of EXCLUSIVE OR circuits 51 of the corresponding detection circuit 52, 53 or 54, is associated with each detection circuit 52 to 54. On the outputs of OR circuits 55, 56 and 57, signals A, B and C are emitted indicating that the associated detection circuit 52 contains at least one operand digit pair with equivalent operand digits. For signals A, B, C, negated signals $\overline{A}$, $\overline{B}$, and $\overline{C}$ are generated by inverter circuits 58, 59, 60. By means of AND circuits 62, operating time control signals EZ, ZZ, DZ, VZ are generated according to the pattern shown below.

TABLE

| A B C | | |
|---|---|---|
| 1 1 1 | EZ | (one cycle) |
| 1 0 1 | ZZ | (two cycles) |
| 1 1 0 | ZZ | (two cycles) |
| 0 1 0 | ZZ | (two cycles) |
| 0 1 1 | ZZ | (two cycles) |
| 1 0 0 | DZ | (three cycles) |
| 0 0 1 | DZ | (three cycles) |
| 0 0 0 | VZ | (four cycles) |

Control signal EZ controls the clock circuit of FIG. 3 to provide only one machine cycle, whereas control signals DZ and VZ cause said clock circuit to provide three and four machine cycles, respectively, whereby the latter four cycles serve to carry out the addition operation. The relation between these control signals and the carry ripple time required for one addition is shown in FIG. 5 in which the three hatched areas are associated with the indicating signals A, B, C of detection circuits 52, 53, 54. The control signal EZ in accordance with the above table is generated when all three detection circuits emit an output signal, i.e., when A, B and C all have the value 1. Such an indication means that each of the digit position groups 5 to 8, 14 to 17 and 23 to 2 contains at least one operand digit pair with equivalent binary values. Therefore, FIG. 5 shows those carry ripple chains that extend over the greatest number of positions. The chains concerned include a possible carry ripple chain originating in digit position 5 and ending in digit position 17 as well as a further possible carry ripple chain originating in digit position 14 and terminating in digit position 26. It is assumed that the operating speed of the electronic circuits of the adder is sufficiently high to permit such carry ripple over eleven digit positions being performed during one clock interval or in one machine cycle.

Control signal ZZ causing two machine cycles to be provided, is generated, in accordance with the above table whenever one of two adjacent detection circuits 52, 53 or 53, 54 emits no indicating signal A, B or C. In such a case carry ripple chains extending over two adjacent adder sections may occur. This applies, for example, to carry ripple chain 63 which starts in digit position 0 and terminates in digit position 17. Control signal ZZ is obtained on the output of an OR circuit 64 connected to a part of the AND circuits 62.

Control signal DZ serves to provide three machine cycles and is generated in accordance with the above table whenever two adjacent detection circuits 52, 53 or 54 supply no indicating signal A, B or C. In this case the carry ripple chains occurring may extend over 26 digit positions, as is, for example, the case with carry chain 65 beginning in digit position 1 and ending in digit position 26. Control signal DZ is obtained from an OR circuit 66 connected to two of the AND circuits 62.

If none of the detection circuits 52, 53, 54 provides an indicating signal, control signal VZ is generated which ensures the generation of four machine cycles in the clock circuit still to be described. Such a control signal for maximum operating times allows for the fact that a carry ripple may occur which extends from the lowest to the highest digit position.

An embodiment of the clock circuit controlled by control signals EZ, ZZ, DZ, VZ is shown in FIG. 3. The circuit concerned is one that normally generates the clock signals 0, 1 to 6 and that is controlled to selectively suppress or skip the clock signals 3, 4 or 5. The circuit comprises two registers 71, 72 each of which has three binary positions. In addition, a three-position binary adder 73 is provided whose inputs are linked to the outputs of register 72 and whose outputs lead to the inputs of register 71. The outputs of register 72 are also connected to a decoder 74 decoding the binary clock count in register 72 into clock control signals 0, 1 to 6. The circuit elements to be controlled and contained in the processing unit provided with the adder in which the circuit of FIG. 2 is used, receive these signals via output lines 75 of decoder 74.

FIG. 4A shows a pulse program of maximum length which is generated by the clock circuit of FIG. 3 when the circuit of FIG. 2 emits the control signal VZ. This pulse program provides for four computing cycles, viz., clocks 2 to 5. The first and the second operand are fed to the adder during clock 0 to 1, respectively. Clock 6 serves to transmit the determined result value, for example, for writing this value into a storage not shown. Simultaneously, during clock 6, the end of the addition is indicated and a subsequent operation, which may be a further addition is initiated. The switching processes to be performed during clocks 0, 1 and 6 are controlled by the signals on the corresponding output lines 75 of decoder 74.

The pulse program of FIG. 4A is executed by the circuit of FIG. 3 in the following manner. It is assumed that register 72 contains the binary clock count 0. Via an AND circuit 69 and an OR circuit 70, a 1 signal is applied to the second input of the lowest digit position of adder 73, as at this stage neither a control signal for clock 2 nor a control signal for clock 6 is emitted on the output of decoder 74. This causes the value of register 72 to be incremented by 1. Alternate basic clock signals (machine cycles) prepare registers 71 and 72 for value input. In accordance with this, register 71 receives the result value 1 from adder 73 during clock T1. Subsequently, during clock T2 this value is fed to register 72, so that the clock control signal 0 on the output of decoder 74 decreases and clock control signal 1 appears. The process or step explained above is repeated until clock control signal 2 appears on the output of the decoder. At this stage AND circuit 69 is inhibited. OR circuit 70, however, continues carrying signals because of the existing control signal VZ which was assumed to be present in the pulse program of FIG. 4A. Via an OR circuit 76, signal VZ is fed to an AND circuit 77 which receives clock control signal 2 as a second input signal. Thus, AND circuit 77 supplies an output signal which is fed to OR circuit 70 which subsequently feeds a further binary 1 to the lowest digit position of adder 73. The count in register 72 is again incremented by 1. During this process the clock circuit advances through clocks 2, 3, 4 and 5 until it reaches the final clock 6.

If control signal EZ, requiring only one computing cycle, appears in lieu of control signal VZ, a signal is fed to the third digit position of the adder via an AND circuit 78 during clock 2. As this digit position has the binary weight $2^2$, adder 73 adds the value 4 to the value 2 in register 72, so that result 6 appears initially in register 71 and subsequently in register 72. Thus, decoder 74 supplies the clock control signal 6 immediately after the clock control signal 2, so that a pulse program in accordance with FIG. 4B is obtained. This pulse program comprises only one computing cycle, as was demanded by the operating time control signal EZ.

Similarly, the operating time control signals DZ and ZZ are used for the different incrementing processes to which the count in register 72 is subjected, with coding circuit 76 to 81 forming the necessary increment values. In the case of a control signal DZ, the binary value 2 is fed to the second digit position of adder 73 via an OR circuit 79, and AND circuit 80 and an OR circuit 81 during clock 2. This leads to the value in register 72 being incremented by 2 so that subsequently binary value 100 appears in register 72. This value is decoded by decoder 74 to form a clock control signal 4. At this stage AND circuit 69 becomes active once again since neither clock control 2 nor clock control signal 6 is available. Thus, the value set in register 72 is incremented by 1, so that initially clock control signal 5 and after a further incrementing step clock control signal 6 is obtained. The operating time allocated to this run was three cycles, as demanded by operating time control signal DZ. During the indicated run the clock circuit generated clock control signals 0, 1, 2, 4, 5 and 6, whereas clock control signal 3 was skipped without any time losses.

Similarly, the operation of the circuit in FIG. 3 is limited to two computing cycles when the circuit of FIG. 2 emits the operating time control signal ZZ. In this case a binary 1 is fed during clock 2 to the lowest digit position of adder 73 via OR circuit 76, AND circuit 77 and OR circuit 70, whereas via OR circuit 79, AND circuit 80 and OR circuit 81 a binary signal with the position value 2 is fed to the next higher digit position of adder 73. Thus, the binary increment value 11, which is added to the binary value 10 in register 72, is applied to this adder at the time indicated. During the subsequent clock T2, the binary value 101 is set in register 72. This value causes clock signal 5 to appear on output 75 of the decoder. The next incrementing cycle proceeds as usual in that adder 73 receives increment value 1 via AND circuit 69 and OR circuit 70. Thus, processing has progressed as far as clock 6 and the operation cycle is ended. The generated pulse diagram is made up of clock control signals 0, 1, 2, 5 and 6, clocks 2 and 5 of which provide the operating time for two computing cycles.

The above description of the circuit in accordance with FIG. 3 shows that the operating time for performing an addition can be selected as a function of the control signals EZ, ZZ, DZ and VZ in a pulse program synchronized with the machine clock of the processing unit. Each addition terminates with the predetermined clock signal that serves to initiate subsequent operations. In this manner, operating time savings of as much as 70 percent can be obtained when using the circuit of FIG. 2 for a greater number of additions.

The clock circuit of FIG. 3 in a slightly modified form can also be used in connection with the embodiment of FIG. 1. As a signal corresponding to the control signal DZ will not be formed in the latter circuit, the circuit elements processing the signal DZ in the circuit of FIG. 3 can be omitted.

What is claimed is:

1. A parallel binary computing arrangement comprising:
    an adder having a plurality of stages with sequential carry propagation between stages, each stage receiving corresponding digit positions of two operands,
    a plurality of detection circuits distributed over the stages of said adder, each said detection circuit receiving the operand digits of at least one digit position of each operand for providing a detector output signal indicating the beginning or the end of a carry ripple by testing the condition "both operand digits 0 or both operand digits 1",
    a coder connected and responsive to the output signals of said detection circuits for providing one of a plurality of group indicating signals, each of which corresponds to a predetermined distance of possible carry ripples between digit positions,
    a clock including pulse generating means for providing a repeatable sequence of a predetermined number of time pulses; and
    clock modifying means, responsive to said group indicating signals from said coder for selectively skipping certain of said time pulses, whereby the operating time between the starting time of said clock sequence if limited to the duration of the carry ripple over the shortest digit position distance determined by said detection circuits.

2. A computing arrangement in accordance with claim 1, wherein:
    each of said detection circuits is associated with, and connected to, a group of adjacent digit positions, said detection circuits being distributed in such a manner that a uniform number of digit positions are unconnected on both sides of each such group.

3. A computing arrangement in accordance with claim 2 wherein:
    each said detection circuit is connected to four adjacent digit positions.

4. a computing arrangement in accordance with claim 3 wherein:
    each of said detection circuits include an EXCLUSIVE OR circuit for each digit position, said EXCLUSIVE OR circuit receiving a digit from one operand in a true form and a digit from the other operand in a negated form.

5. A computing arrangement in accordance with claim 4 wherein each of said detection circuits further includes:
    an OR circuit connected, and responsive to, said EXCLUSIVE OR circuits for providing said detector output signal.

6. Computing arrangement in accordance with claim 5 wherein said coder includes:

first, second, third, and fourth group indicating means connected to said detection circuit means, said first group indicating means responding to an output from all said detection circuits for providing a first group indicating signal which serves to select a first operating time, said second group indicating means responding to the absence of an output from one of said detection circuits and an output of two adjacent ones of said detection circuits, or from the positive output signal of said one detection circuit and the absence of an output from at least one of said adjacent detection circuits for producing a second group indicating signal which serves to select a second operating time that is longer than the first operating time, said third group indicating means responding to the absence of an output from two adjacent ones of said detection circuits for producing a third group indicating signal which serves to select a third operating time exceeding the second operating time, and said fourth group indicating means responding to the absence of an output from all said detection circuits for producing a fourth indicating signal which serves to select a fourth operating time exceeding all the other operating times.

7. A computing arrangement in accordance with claim 6 wherein said clock includes:

a counter; and said clock modifying means further includes means connected between said coder and said counter for generating increment signals of different values in accordance with the one of said group indicating signals generated, whereby said counter is caused to skip individual clock cycles.

8. A computing arrangement in accordance with claim 7 wherein said counter includes:

a register circuit for storing the current clock count; and an adder connected to said register and said clock modifying means, which forms a loop together with the register circuit, and which receives the current clock count together with said increment signals as input operands.

* * * * *